United States Patent [19]

Miyoshi

[11] Patent Number: 4,959,780
[45] Date of Patent: Sep. 25, 1990

[54] MICROPROGRAM PROCESSOR WITH LOGIC CIRCUITRY FOR COMBINING SIGNALS FROM A MICROCODE DECODER AND AN INSTRUCTION CODE DECODER TO PRODUCE A MEMORY ACCESS SIGNAL

[75] Inventor: Akio Miyoshi, Ome, Japan

[73] Assignee: Kabushiki Kaisha Toshiba, Kawasaki, Japan

[21] Appl. No.: 175,293

[22] Filed: Mar. 30, 1988

[30] Foreign Application Priority Data

Mar. 31, 1987 [JP] Japan ............................. 62-79164

[51] Int. Cl.$^5$ ..................... G06F 13/00; G06F 9/22
[52] U.S. Cl. ........................... 364/200; 364/262.8; 364/263.1
[58] Field of Search ... 364/200 MS File, 900 MS File

[56] References Cited

U.S. PATENT DOCUMENTS 4,402,042 8/1983 Guttag ............................. 364/200
4,729,093 3/1988 Mothersole .................... 364/200

Primary Examiner—Lawrence E. Anderson
Attorney, Agent, or Firm—Foley & Lardner, Schwartz, Jeffery, Schwaab, Mack, Blumenthal & Evans

[57] ABSTRACT

A microprogram processor to execute high speed memory access when an operand indicates a memory is provided. This microprogram processor comprises an instruction register for holding a unit length of an instruction code, an instruction decoder for decoding an instruction code in the register, thus generating a signal dependent upon the fact that the operand indicates a register or a memory, a microcode decoder for decoding a microcode generated from a ROM depending upon the instruction code, thus generating a noncondition memory access signal and a next instruction start condition signal, and a next instruction start condition judgement decoder connected to receive both an output from the instruction code decoder and the next instruction start condition signal to judge whether or not the next instruction start is correct. The microcode decoder further generates a conditional memory access signal when the operand indicates a memory. Thus, a memory access signal generator circuit, e.g., comprised of a simple logic circuit responds to the conditional memory access signal and an output signal from the instruction code decoder to generate a memory access signal for starting memory access.

1 Claim, 2 Drawing Sheets

MICROPROGRAM PROCESSOR WITH LOGIC CIRCUITRY FOR COMBINING SIGNALS FROM A MICROCODE DECODER AND AN INSTRUCTION CODE DECODER TO PRODUCE A MEMORY ACCESS SIGNAL

BACKGROUND OF THE INVENTION

This invention relates to the processor of a microprogram system, and more particularly to microprocessor capable of executing a high speed processing.

For instructions used in a computer such as a microprocessor, in spite of performing the same operation, for example, an operation for performing the logical product, there are instances where an operand indicates a register and the operand indicates a memory device. Such instructions having different operands are recognized to be quite different from each other in computer of the microprogram system. Accordingly, different microprograms are used in respective cases, or a conditional jump microcode or a conditional next instruction start microcode, where a conditioning portion exists in the microcode so as to change the start of a next instruction, is prepared, depending upon the kind of operands, thus discriminating from each other instructions having different operands in the microprogram.

In a conventional microprogram processor having such a function, when the operand indicates a memory, a request for access to the memory can be first made at a next step at least one clock later after a next instruction start signal has been outputted from a next instruction start condition judgement decoder. For this reason, the start of access to the memory is delayed whereby the completion of execution of the instruction is also delayed, with the result that the instruction execution time will be prolonged.

As just described above, the conventional microprogram processor has the problem that access to the memory is delayed and thus the instruction execution time is prolonged, failing to satisfy high speed requirements.

SUMMARY OF THE INVENTION

Therefore, an object of this invention is to provide a microprogram processor capable of quickly providing memory access when the operand indicates a memory device.

According to this invention, this and other objects are accomplished by providing a microprogram processor comprising instruction holding means for holding an instruction code of a unit length, instruction code decoding means for decoding the instruction code in the instruction holding means, thus to generate a signal dependent upon the fact that the operand indicates a register or a memory, microcode decoding means for decoding a microcode generated from a microprogram ROM (Read Only Memory) depending upon the instruction code, thus to generate a unconditional memory access signal and a next instruction start condition signal, next instruction start condition judgement decoding means for inputting both an output from the instruction code decoding means and the next instruction start condition signal from the microcode decoding means to judge whether the next instruction start is correct, second microcode decoding means for generating a conditional memory access signal when the operand indicates the memory, provided in the microcode decoding means, and means for generating a memory access signal for starting a memory access on the basis of the conditional memory access signal and an output signal from the instruction code decoding means.

In accordance with this invention, only when the operand indicates a memory device, a conditional memory access microcode for generating a specified output from the microcode decoder is used to output a memory access signal on the basis of a signal thus generated. Thus, quick memory access is possible, resulting in reduced instruction execution time.

A preferred embodiment of this embodiment will be described in detail with reference to the accompanying drawings

DESCRIPTION OF THE PREFERRED EMBODIMENT

For a better understanding of this invention, a conventional microprogram processor will be first described.

Figure 1:
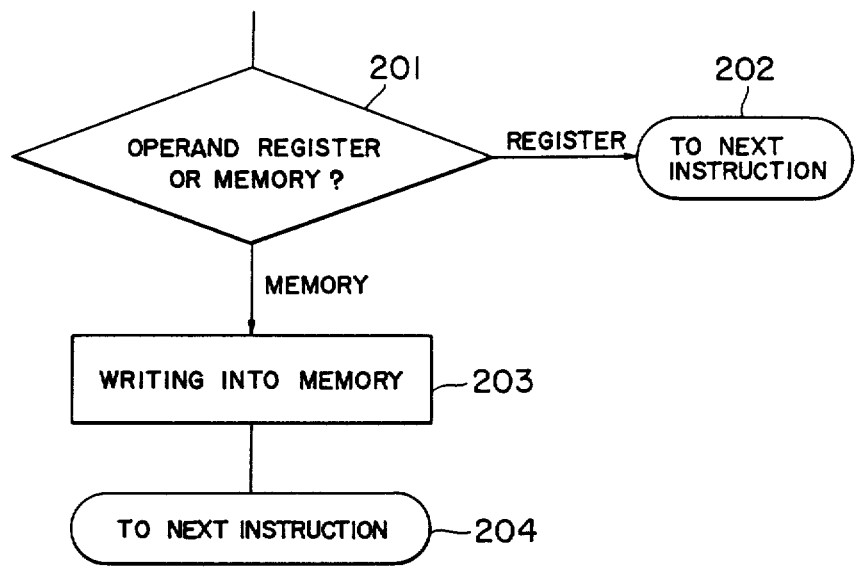
FIG. 1 is a flowchart showing the operation in a conventional microprogram.

In FIG. 1, discriminative operation as to whether the operand indicates a register or a memory is performed first (step 201). When the result of that judgement shows that the operand indicates a register, the program execution directly shifts to a next instruction (step 202). On the other hand, when the result of that judgement shows that the operand indicates a memory, writing into the memory is conducted (step 203), and then the program execution is advanced to a next instruction (step 204).

Figure 2:
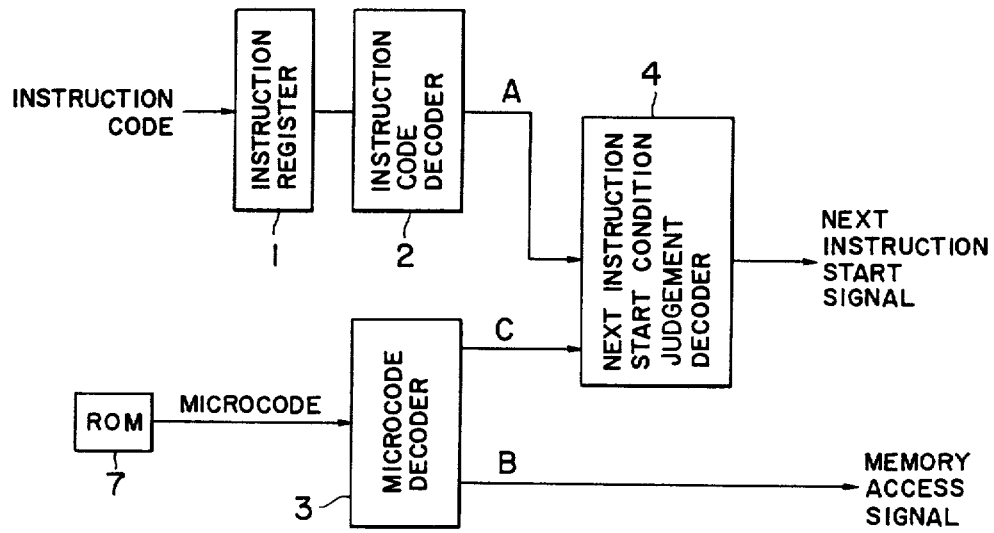
FIG. 2 is a block diagram showing a typical connection of a conventional microprogram processor for realizing the operation in FIG. 1.

FIG. 2, shows an instruction register 1 to which a unit length of an instruction code, e.g., 8 bits is inputted and the output of this register is inputted to an instruction code decoder 2, at which decoding of the instruction is carried out in accordance with a predetermined procedure.

A microcode output from a ROM 7 in which a microprogram for generating a microcode corresponding to an instruction code is stored is inputted to a microcode decoder 3. From the microcode decoder 3, a signal B, generated when an access to the memory should be provided, and a signal C, generated when the program execution is transferred to a next instruction without providing an access to the memory, are outputted, respectively. This signal C is applied to a next instruction start condition judgement decoder 4 along with a decoded output A from the above-mentioned instruction code decoder 2. When, it is judged in the next instruction start condition judgement decoder 4 that the execution of a next instruction should be started in accordance with a predetermined judgement procedure, a next instruction start signal is outputted.

As just described above, with the conventional microprogram processor, as previously described, when the operand indicates a memory, a request for access to the memory is provided after the next instruction start signal has been outputted, thus resulting in a delayed start of access.

Figure 3:
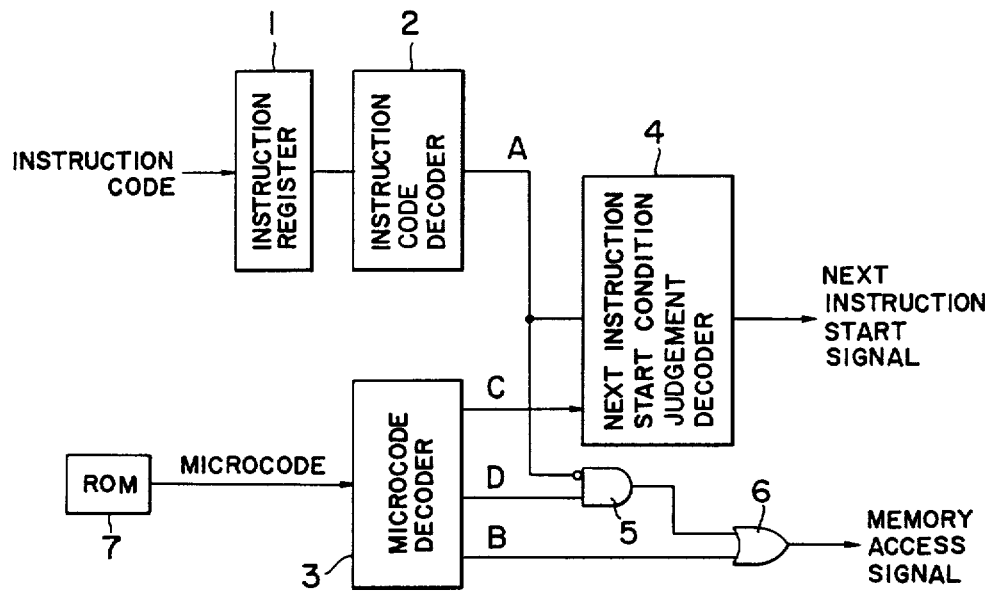
FIG. 3 is a block diagram showing the connection of the essential parts of a microprogram processor according to this invention.

Turning now to FIG. 3, similarly to the case shown in FIG. 2, a unit length of an instruction code, e.g., 8 bits is inputted to the instruction register 1 and is held therein. The output from the instruction register 1 is supplied to the instruction code decoder 2 for decoding. A microcode output in accordance with an instruction from a ROM (not shown) in which a microprogram is stored is inputted to the microcode decoder 3. From the microcode decoder 3, a signal B generated when access to the memory should be made and a signal C which becomes effective when the process step is transferred to the next instruction without making access to the memory are outputted, respectively. This signal C is sent to the next instruction start condition judgement decoder 4 along with a decoded output A from the instruction code decoder 2. Thus, a next instruction start signal is outputted depending upon a result of judgement made in this decoder 4.

Figure 5:
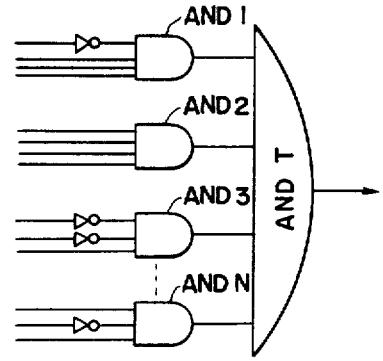
FIG. 5 is a circuit diagram showing an embodiment of a conditional memory access code decoding means.

This embodiment differs from the conventional circuit in that there is provided means in which such a conditional memory access microcode for generating a specified output from the microcode decoder 3 only when the operand indicates a memory is used for microcode, thereby to decode that microcode, and in that a logic circuit for generating a memory access signal on the basis of that specified output is provided. Namely, a microcode decoder 3 is provided, as shown in FIG. 5, having conditional memory access code decoding means comprising AND gates AND 1 to AND N which are inputted with respective bits of a microcode and AND gate AND T which causes logical multiplication of outputs of AND 1 to AND N, to generate a signal when a code constituted by these bits corresponds to a predetermined condition. This decoding means is adapted to output a signal D when it receives a conditional memory access microcode. This signal D is applied to an AND gate 5 together with a signal obtained by inverting the signal A which is the output from the instruction code decoder 2. The output from the AND gate 5 is applied to input terminals of an OR gate 6 together with the output B from the microcode decoder 3. The output from the OR gate 6 serves as a memory access signal.

With the circuit stated above, when the operand indicates a memory, the output D from the microcode decoder is "1" and the output A from the instruction code decoder 2 is "0". As a result, the AND condition of the AND gate 5 holds, so that the output of the AND gate 5 becomes "1". Thus, a memory access signal is immediately outputted via the OR gate 6.

Figure 4:
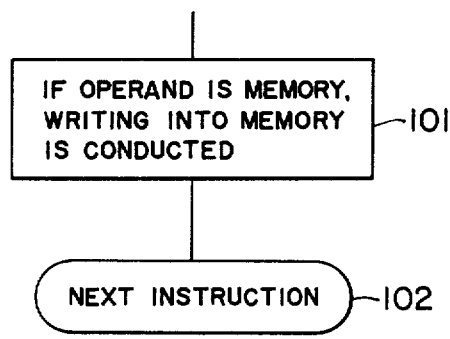
FIG. 4 is a flowchart showing the operation in FIG. 3.

The time at which the signal D is outputted is substantially coincident with that of the signal C, and is earlier than the timing at which a judgement signal is produced from the next instruction start condition judgement decoder 4 or the timing at which the signal B is produced. Accordingly, as indicated by the flowchart in FIG. 4, when the operand indicates a memory, a memory access signal is outputted at a time earlier than that of the conventional memory access signal and thus writing into the memory is conducted (step 101). At the next step, the program is advanced to the next instruction execution (step 102). Accordingly, the time required for access to memory when the operand indicates a memory is reduced by a time corresponding to one step, resulting in faster access speed.

Although the signals A and C were assumed as "0" and "1" respectively, when the operand indicates a memory, this invention is not limited such an implementation. In accordance with the construction of a logic circuit employed, signals having optimum values may be used.

What is claimed is:

1. A microprogram processor comprising:
   instruction holding means for receiving and holding a unit length of a macro instruction code;
   instruction code decoding means for receiving said instruction code from said instruction holding means and decoding said code to generate an output signal dependent upon the fact that the operand and said received instruction code indicates a register or a memory;
   storing means for storing microprograms provided for respective macro instruction codes and supplying microcodes;
   microcode decoding means for decoding said microcodes supplied from said storing means and generating an unconditional memory access signal and a conditional signal for starting a next instruction depending upon said macro instruction code, and generating a conditional memory access signal when a conditional memory access microcode causes said microcode decoding means to generate a specific output if said operand for said instruction indicates a memory;
   means for judging a next instruction start condition connected to receive said output signal from said instruction code decoding means and said conditional signal for starting a next instruction from said microcode decoding means to judge whether or not said next instruction start is correct; and
   means for generating a memory access signal for starting access of a memory on the basis of said unconditional memory access signal, said conditional memory access signal and said output signal from said instruction code decoding means,
   wherein said microcode decoding means comprises decoding means for decoding a specific microcode to generate said conditional signal for starting said next instruction and
   wherein said means for generating said memory access signal comprises a logical product circuit for generating said memory access signal which is a logical product signal of said conditional memory access signal and said output from said instruction code decoding means, and a logical sum circuit for generating a logical sum signal of the logical product signal and said unconditional memory access signal.

* * * * *